United States Patent
Hassanpour Isfahani

(10) Patent No.: US 9,680,402 B2
(45) Date of Patent: Jun. 13, 2017

(54) DRIVER CIRCUIT AND METHOD FOR SINGLE-PHASE AND THREE-PHASE INDUCTION MOTORS

(71) Applicant: Everette Energy, LLC, Dallas, TX (US)

(72) Inventor: Arash Hassanpour Isfahani, Dallas, TX (US)

(73) Assignee: Everette Energy, LLC, Dallas, TX (US)

( * ) Notice: Subject to any disclaimer, the term of this patent is extended or adjusted under 35 U.S.C. 154(b) by 51 days.

(21) Appl. No.: 14/922,890

(22) Filed: Oct. 26, 2015

(65) Prior Publication Data

US 2017/0117826 A1 Apr. 27, 2017

(51) Int. Cl.
*H02P 1/30* (2006.01)
*H02P 1/42* (2006.01)

(52) U.S. Cl.
CPC .............. *H02P 1/423* (2013.01); *H02P 1/30* (2013.01)

(58) Field of Classification Search
CPC .................................. H02P 1/423; H02P 1/30
USPC ......................................... 318/727, 767, 778
See application file for complete search history.

(56) References Cited

U.S. PATENT DOCUMENTS

| | | | | |
|---|---|---|---|---|
| 6,348,790 B1 * | 2/2002 | Aler | ...................... | G01P 13/045 324/165 |
| 2002/0145400 A1 * | 10/2002 | Cashatt | ................... | H02P 23/26 318/727 |
| 2008/0074070 A1 * | 3/2008 | Kumar | ...................... | B60L 9/00 318/561 |
| 2013/0285588 A1 * | 10/2013 | Ito | .......................... | H02P 23/14 318/490 |
| 2014/0265990 A1 * | 9/2014 | Chretien | ................. | H02P 21/16 318/558 |

OTHER PUBLICATIONS

Microchip AN967: "Bidirectional VF Control of Single and 3-Phase Induction Motors Using the PIC16F72," Microchip Technology Inc., 2005, DS009671—pp. 1-18.

* cited by examiner

*Primary Examiner* — Kawing Chan
(74) *Attorney, Agent, or Firm* — Gardere Wynne Sewell, LLP; Andre M. Szuwalski

(57) ABSTRACT

A control circuit for an induction motor operates to determine whether the inductor motor is of the three-phase type or single-phase type. If three-phase, a variable frequency drive operation is implemented. If single-phase, a closed loop current control process is implemented. The closed loop current control process includes an operation by the control circuit to measure winding resistances and determine a turns ratio for the main and auxiliary motor windings. The turns ratio is used in the closed loop current control process to scale a measurement of current in the auxiliary winding for the purpose of generating the control voltage for the auxiliary winding. Phase of the current in the windings is further processed to generate a phase control signal.

13 Claims, 6 Drawing Sheets

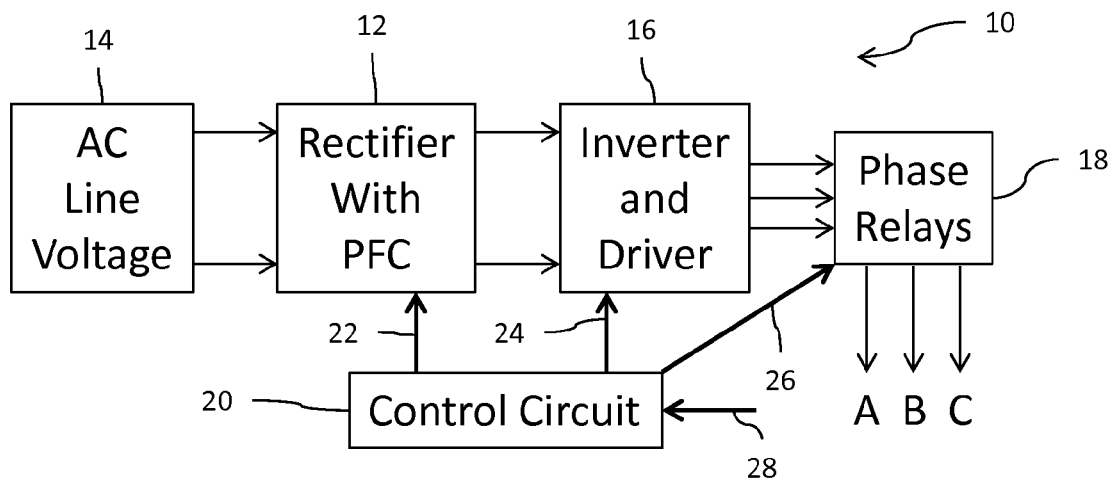
FIG. 1
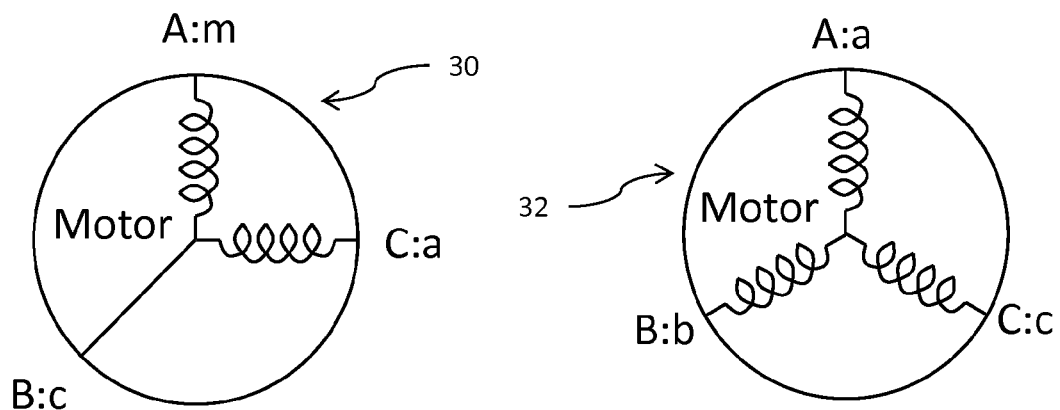
FIG. 2A
FIG. 2B

US 9,680,402 B2

DRIVER CIRCUIT AND METHOD FOR SINGLE-PHASE AND THREE-PHASE INDUCTION MOTORS

TECHNICAL FIELD

This invention relates generally to motor drive circuits, and more particularly to a drive circuit configured to control operation of an induction motor in either a single-phase or three-phase configuration.

BACKGROUND

An induction or asynchronous motor is an AC electric motor in which the electric current in the rotor needed to produce torque is obtained by electromagnetic induction from the magnetic field of the stator winding. An induction motor therefore does not require mechanical commutation, separate-excitation or self-excitation with respect to transfer of energy from stator to rotor, and is thus quite different from universal, DC and large synchronous motors. Thus, the induction motor's essential operating characteristic is that rotation is created solely by induction instead of through use of separate winding excitation (as in synchronous or DC machines) or through self-magnetization (as in permanent magnet motors).

Induction motors are commonly used in many industrial and commercial applications. Such motors have well known advantages including low production cost, easy operation, easy maintenance and relatively good efficiency.

Techniques for controlling the speed of induction motors are well known in the art. With the advent of semiconductor power electronics and control circuits, it has become much easier to exercise motor control. However, there continues to be a need for improved driver systems for use with induction motors, and there is also a need for a single driver system solution compatible with both single-phase and three-phase induction motors.

SUMMARY

In an embodiment, a method for controlling an induction motor having a first motor terminal, a second motor terminal and a third motor terminal comprises: measuring resistances of motor windings between pairs of the first, second and third motor terminals; processing the measured resistances to determine whether the induction motor is three-phase induction motor or a single-phase induction motor; if the induction motor is determined to be a three-phase induction motor, then controlling the three-phase induction motor using a variable frequency drive process; and if the induction motor is determined to be a single-phase induction motor, then controlling the single-phase induction motor using a closed loop current control process.

In an embodiment, controlling the single-phase induction motor further comprises: determining a turn ratio for the main and auxiliary windings of the single-phase induction motor; scaling a measured magnitude of the current in the auxiliary winding of the single-phase induction motor by said turn ratio; and determining a control voltage for said auxiliary winding from the scaled measured magnitude of the current in the auxiliary winding.

In an embodiment, controlling the single-phase induction motor further comprises: determining a phase of the current in the main winding; determining a phase of the current in the auxiliary winding; determining a phase difference between the phases; determining an error difference between the determined phase difference and a reference angle; calculating a phase angle control signal from the determined error difference.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 1 is a block diagram of an induction motor drive system;

FIGS. 2A and 2B illustrate single-phase and three-phase induction motor configurations;

DETAILED DESCRIPTION OF THE DRAWINGS

Figure 3:
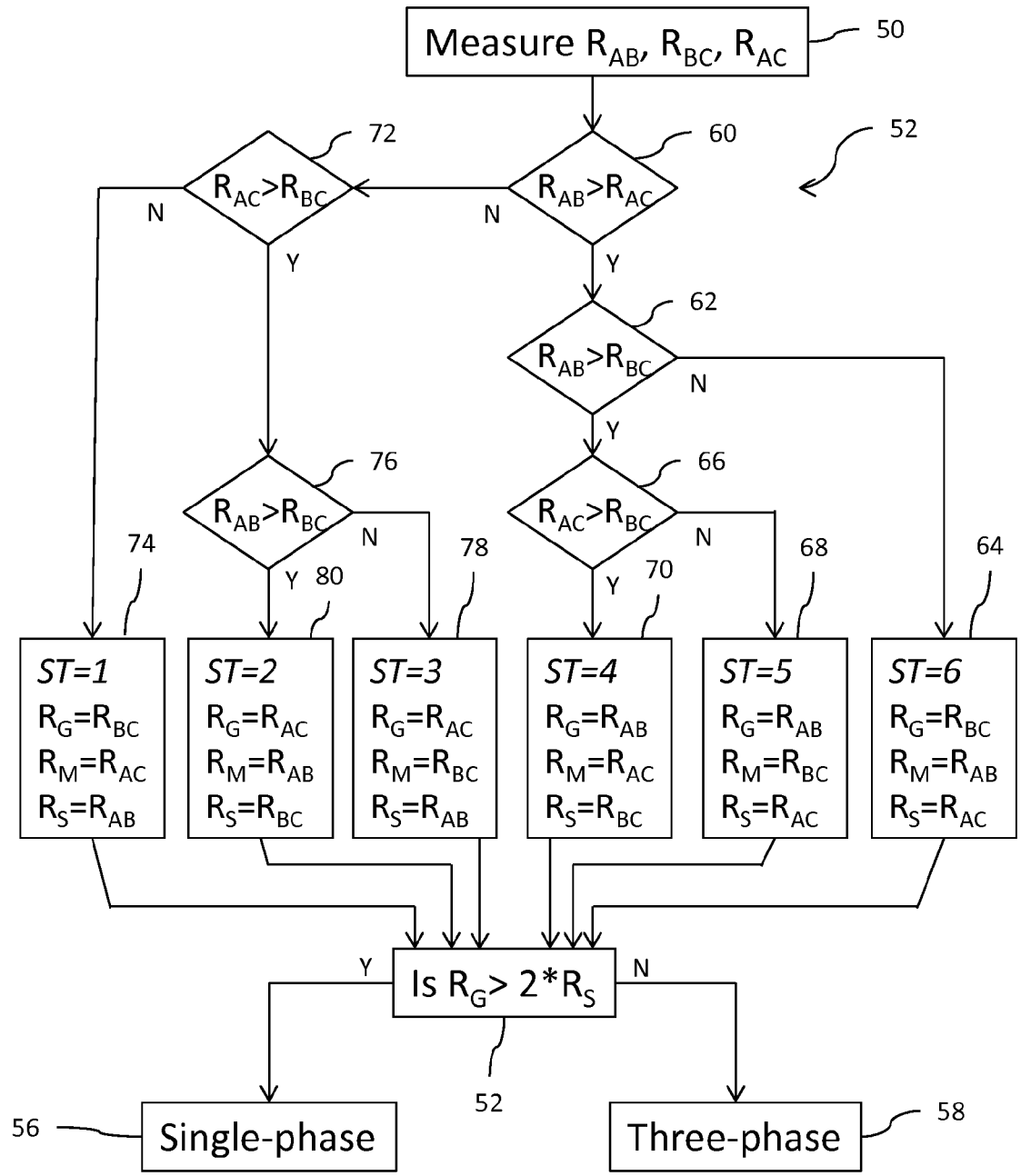
FIG. 3 is a flow diagram for a process to identify a type of motor connected to the system.

Reference is now made to FIG. 1 showing a block diagram of an induction motor drive system 10. A rectifier and power factor correction (PFC) circuit 12 is connected to receive an alternating current (AC) voltage from a source 14 of AC line voltage (such as from the power grid) and generate a direct current (DC) voltage (also referred to in the art as a DC link voltage). An inverter and driver circuit 16 converts the DC voltage into a plurality of drive signals for application to the terminals of an induction motor through a phase relay circuit 18. A control circuit 20 generates a first set 22 of control signals to control operation of the rectifier and PFC circuit 12. The control circuit 20 further generates a second set 24 of control signals to control operation of the inverter and driver circuit 16. The control circuit 20 further generates a third set 26 of control signals to control operation of the phase relay circuit 18. The control circuit 20 further receives a plurality of sense signals 28 relating to sensed currents and voltages at various locations within the induction motor drive system 10.

The system 10 generates three drive signals A, B and C for application to an induction motor. FIG. 2A shows a diagram of a single-phase induction motor 30 and the connection of the drive signals A, B and C to the "a" (auxiliary), "m" (main) and "c" (common) terminals of the motor 30. FIG. 2B shows a diagram of a three-phase induction motor 32 and the connection of the drive signals A, B and C to the corresponding "a" phase, "b" phase and "c" phase terminals of the motor 32.

The system 10 supports connection to either the single-phase motor 30 or the three-phase motor 32. The system 10 first operates to determine the type of motor (single-phase or three-phase) that is connected. The system 10 then determines the turn ratio for the connected motor if the motor is of the single-phase type. Then, in response to the determined motor type, the system 10 selects the appropriate control algorithm for operating that motor.

Reference is now made to FIG. 3 showing a flow diagram for a process executed by the control circuit 20 to identify the type of motor connected to the system 10. In step 50, the system measures the resistances between each pair of terminals of the motor. The methodology for accomplishing this resistance measurement will be discussed in detail below. After the three resistance measurements are obtained, the resistances are sorted based on resistance value using a sort process 52. One example of the sort process 52 is shown in FIG. 3 and will be described in detail below. After the sort is completed, the resistance having the greatest value ($R_G$) is compared to the resistance having the smallest value ($R_S$) in step 54. If RG>2*RS, then the connected motor is identified in step 56 as a single-phase motor. Otherwise, the connected motor is identified in step 58 as a three-phase motor.

With respect to the sort process 52, a tree sort processing operation can be performed. In step 60, the first measured resistance $R_{AB}$ (for example, the resistance between the motor terminals for A and B) is compared to the second measured resistance $R_{AC}$ (for example, the resistance between the motor terminals for A and C). If $R_{AB}$>$R_{AC}$, then the first measured resistance $R_{AB}$ is compared to the third measured resistance $R_{BC}$ (for example, the resistance between the motor terminals for B and A) in step 62. If $R_{AB}$ is not greater than $R_{BC}$, then step 64 identifies the resistance having the greatest value $R_G$ as $R_{BC}$, the middle resistance ($R_M$) as $R_{AB}$ and the resistance having the smallest value $R_S$ as $R_{AC}$. If $R_{AB}$ is greater than $R_{BC}$, then the second measured resistance $R_{AC}$ is compared to the third measured resistance $R_{BC}$ in step 66. If $R_{AC}$ is not greater than $R_{BC}$, then step 68 identifies the resistance having the greatest value $R_G$ as $R_{AB}$, the middle resistance as $R_{BC}$ and the resistance having the smallest value $R_S$ as $R_{AC}$. If $R_{AC}$ is greater than $R_{BC}$, then step 70 identifies the resistance having the greatest value $R_G$ as $R_{AB}$, the middle resistance as $R_{AC}$ and the resistance having the smallest value $R_S$ as $R_{BC}$. If $R_{AB}$ is not greater than $R_{AC}$ (step 60), then the second measured resistance $R_{AC}$ is compared to the third measured resistance $R_{BC}$ in step 72. If $R_{AC}$ is not greater than $R_{BC}$, then step 74 identifies the resistance having the greatest value $R_G$ as $R_{BC}$, the middle resistance $R_M$ as $R_{AC}$ and the resistance having the smallest value $R_S$ as $R_{AB}$. If $R_{AC}$ is greater than $R_{BC}$, then the first measured resistance $R_{AB}$ is compared to the third measured resistance $R_{BC}$ in step 76. If $R_{AB}$ is not greater than $R_{BC}$, then step 78 identifies the resistance having the greatest value $R_G$ as $R_{AC}$, the middle resistance as $R_{BC}$ and the resistance having the smallest value $R_S$ as $R_{AB}$. If $R_{AB}$ is greater than $R_{BC}$, then step 80 identifies the resistance having the greatest value $R_G$ as $R_{AC}$, the middle resistance as $R_{AB}$ and the resistance having the smallest value $R_S$ as $R_{BC}$.

The measurement in step 50 of FIG. 3 of resistance between a given pair of terminals of the motor is accomplished by applying a pulse width modulated (PWM) DC voltage between that pair of motor terminals while the third terminal is disconnected. This operation is supported by the phase relay circuit 18 and the third set 26 of control signals which cause the drive signals for the PWM DC voltage to be selectively applied to two motor terminals by actuating the corresponding relays of the phase relay circuit 18 while simultaneously disconnecting (floating) the third motor terminal by deactuating the corresponding relay of the phase relay circuit 18. After the expiration of a delay time period following initial assertion of the PWM DC voltage to allow the motor to reach a steady state condition, measurements are made as to current flowing through the motor and voltage applied to the motor. The ratio of average voltage to average current provides the resistance between the two terminals. The process is repeated for each pair of motor terminals until all three resistance measurements are obtained.

The delay time period can be a fixed delay sufficient to achieve steady state. Alternatively, the delay time period expires when a steady stage check of motor operation is completed. Steady state operation is identified by sensing the measured current and determining when a rate of change in measured current falls below a threshold.

Figure 4:
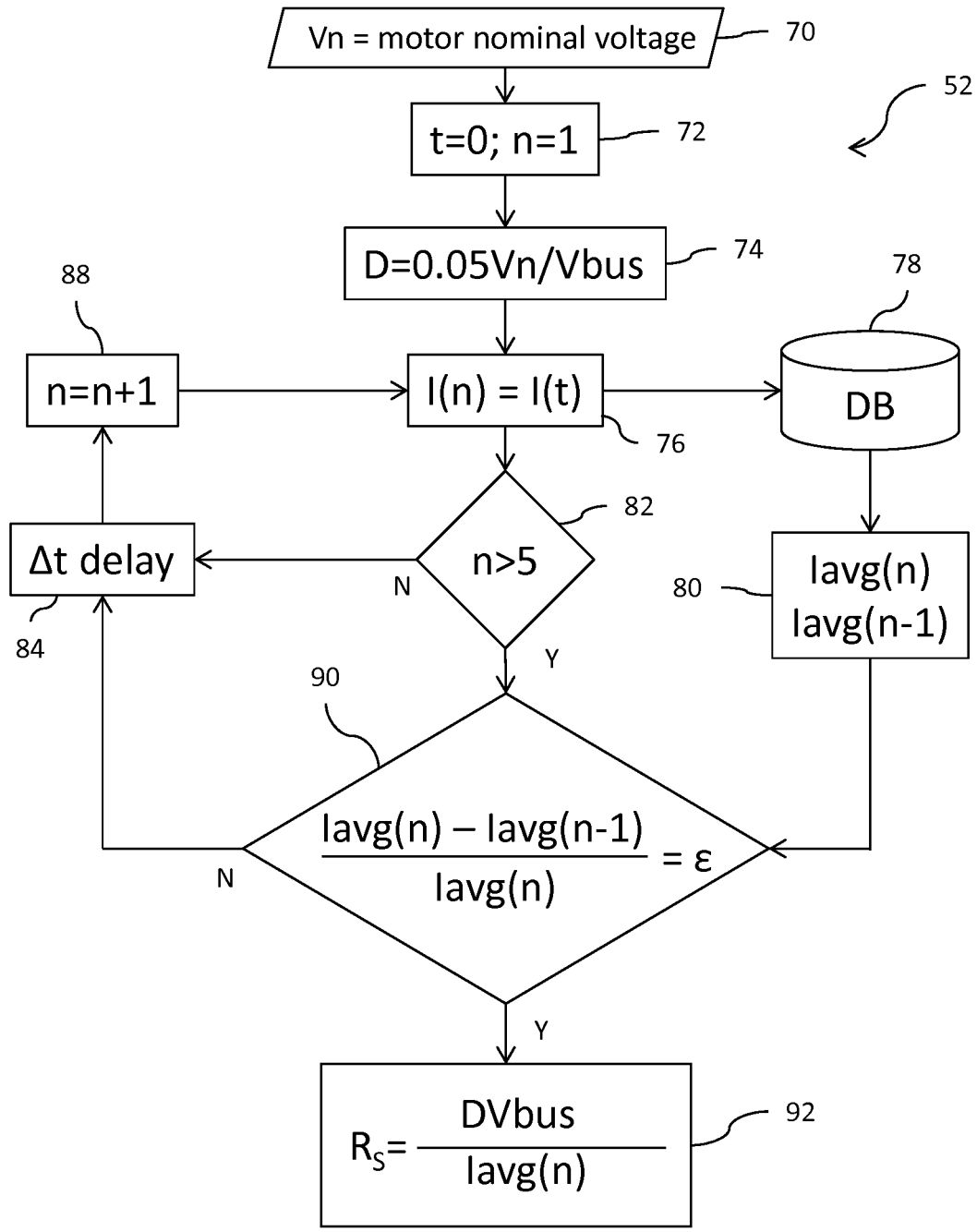
FIG. 4 is a flow diagram for a process to measure resistance between terminals of the motor.

Reference is now made to FIG. 4 showing a flow diagram for a process executed by the control circuit 20 to measure the resistances between each pair of terminals of the motor (as generally indicated at step 50 of FIG. 3). Since the stator resistance measurement is based on a DC test, the input voltage has to be 5% of the machine nominal voltage in order to avoid burning the winding. The reference to Vn is the motor nominal voltage input by the user in step 70. Step 72 sets initial conditions which is resetting time and counter. Step 74 sets the duty cycle D in order to achieve 5% of the ratio of the nominal voltage Vn to the output bus voltage Vbus.

FIG. 1 shows how the inverter is connected to the motor winding. The voltage Vbus is the voltage output from the rectifier with PFC 12 to the inverter and driver 16. This voltage Vbus may, for example, be stored on a DC bus capacitor. Each leg of the driver is connected to the motor terminal through a relay provided by phase relays 18. For measurement of, for example, the resistance between terminal A and terminal B, the relay for terminal C is controlled to an open condition and the relays for terminals A and B are control in a closed condition. In this condition, for applying the duty cycle of D, the switches in the inverter and driver 16 are selectively controlled for a time period DT to apply a DC voltage of the Vbus magnitude between terminal A and B. Then, for a time period (1-D)T, the switches in the inverter and driver 16 are selectively controlled to short circuit terminals A and B together (i.e., apply a zero voltage between terminals A and B). This operation will be repeated with a time period of T. Therefore, the average applied voltage would be DVbus or 0.05Vn.

The current in the windings due to the application of voltage is sensed in step 76 with each increment of the counter n and stored in the database in step 78. When n is less than or equal to a threshold (for example, 5), as tested in step 82, a delay 84 is asserted and the counter is incremented by one in step 88 before returning to step 76 to take another current sample. When n exceeds the threshold (step 82), a sufficient number of current samples have been stored in the database 78 to permit checking for the current average in step 90. The rate of change in current average which is calculated in step 90 to provide an indication as to how far the rate of change is from the steady-state condition. Therefore, when this rate calculated in step 90 is less than a specific limit, it is assumed that the steady-state condition is reached and stator resistance can be calculated in the step 92. Otherwise, the process returns after the delay 84 to increment in step 88 and repeat the process with an additional sample taken at step 76.

If the determination in step 58 of FIG. 3 is that the connected motor is a three-phase motor, the system 10 implements a conventional variable frequency drive (VFD) algorithm for controlling operation of the motor. Such algorithms are well known to those skilled in the art. An example of such an algorithm is shown in B. K. Bose, Modern power electronics and AC drive, Prentice Hall PTR, 2002, pp. 339 (incorporated by reference) for open loop VFD control of a three-phase induction motor.

If the determination in step 56 of FIG. 3 is that the connected motor is a single-phase motor, the system 10 implements a closed loop current control method for driving the motor.

Figure 5:
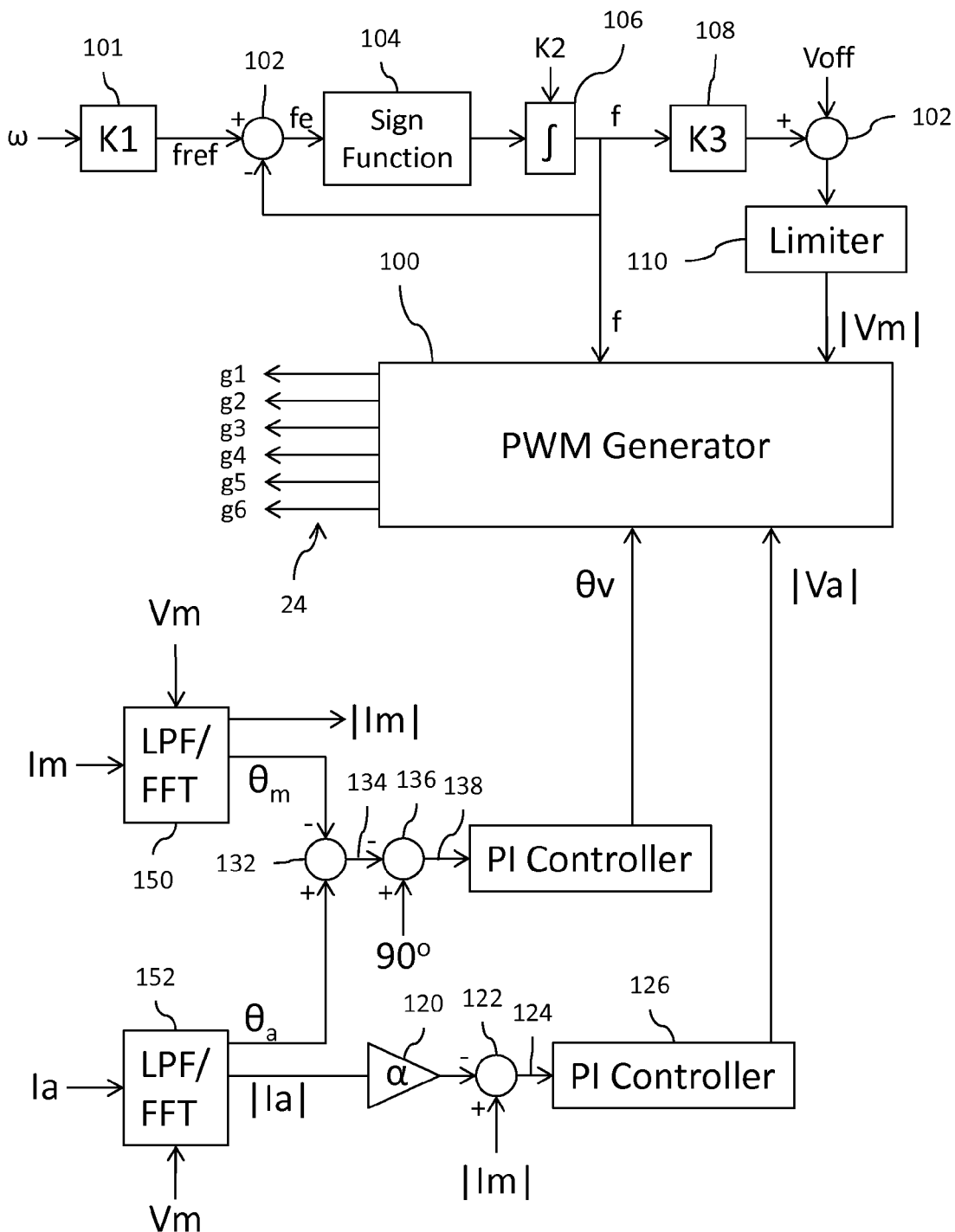
FIG. 5 is a diagram illustrating a closed loop voltage control process for driving a single-phase motor.

Reference is now made to FIG. 5 showing an embodiment of closed loop current control method for driving the single-phase motor implemented by the control circuit 20. A pulse width modulation (PWM) generator circuit 100 generates the second set 24 of control signals (referenced as g1-g6) to control operation of the six switches within the inverter and driver circuit 16 (see, FIG. 1) based on three parameters: a) the magnitude of the main voltage |Vm| for the main winding (m) of the motor; b) the magnitude of the auxiliary voltage |Va| for the auxiliary winding (a) of the motor; and c) the phase angle θv between the main and auxiliary voltages. The signals g1 and g2 are complementary digital signals, the signals g3 and g4 and complementary digital signals, and the signals g5 and g6 are complementary digital signals.

The main winding voltage is computed by input frequency command and is based on an open loop variable frequency methodology. The speed reference ω is converted to a frequency reference fref by an appropriate coefficient K1 in block 101. The frequency reference fref is received and passed through a summation circuit 102 which subtracts a frequency command f signal. The result is a frequency error signal fe that is passed through a sign circuit 104 function and an integration circuit 106 function to produce the frequency command f. A feedback loop 108 passes the frequency command back to the summation circuit 102 where it is subtracted from the received frequency command signal fref. This circuitry permits only an incremental change in the frequency command f signal (based on the increment defined by K2) at the output of the integration circuit 106 so as to ensure soft starting.

The frequency command f output from the integration circuit 106 is converted to a voltage by an appropriate coefficient K3 in block 108. A summing circuit 109 adds an offset voltage Voff to the converted voltage to generate a compensated voltage. The compensated voltage is then passed through a limiting circuit 110 which limits (or clamps) the maximum and minimum permitted values for main winding voltage Vm. The main winding voltage Vm along with the frequency command f signal are passed to the PWM generator circuit 100 for producing the control signals 24 (referenced as g1-g6).

With respect to the magnitude of the auxiliary voltage |Va| for the auxiliary winding (a) of the motor and the phase angle θv between the main and auxiliary voltages, the control circuit 20 effectuates control over the currents in the main and auxiliary motor phase windings. The system 10 provides for a balanced operation where a) the ratio of the main winding current to the auxiliary winding current is equal to the turn ratio and b) the phase angle between the main winding current to the auxiliary winding current match the angle between the main and auxiliary phase windings (for example, at 90° or at whatever angle is present if the main and auxiliary phase winding as not exactly perpendicular to each other).

A first circuit 150 receives the sensed the current Im flowing in the main phase winding and the main voltage Vm for the main phase winding. The circuit 150 uses a low pass filter circuit to remove high frequency components and a Fast Fourier Transform circuit to calculate the magnitude of the main current |Im| and determine the phase θm of the main current Im. A second circuit 152 receives the sensed the current Ia flowing in the auxiliary phase winding and the main voltage Vm for the main phase winding. The circuit 152 uses a low pass filter circuit to remove high frequency components and a Fast Fourier Transform circuit to calculate the magnitude of the auxiliary current |Ia| and determine the phase θa of the auxiliary current Ia.

Turning first to the calculation of the magnitude of the auxiliary voltage |Va| for the auxiliary winding (a) of the motor, the control circuit 20 uses circuits 150 and 152 to sense the current (Im) flowing in the main phase winding as well as the current (Ia) flowing in the auxiliary phase winding. A scaling circuit 120 scales the magnitude of the auxiliary current |Ia| by a turn ratio factor α. A differencing circuit 122 calculates the difference between the magnitude of the main current |Im| and the scaled magnitude of the auxiliary current (αIa) to generate an error signal 124. A proportional-integral (PI) control circuit 126 processes the error signal 124 to generate the magnitude of the auxiliary voltage |Va| control signal for the auxiliary winding (a) of the motor for processing by the PWM generator circuit 100.

Turning next to the calculation of the phase angle θv between the main and auxiliary currents, a differencing circuit 132 calculates the difference between the phase θm of the main current Im and the phase θa of the auxiliary current Ia to generate a phase error signal 134. The phase error signal 134 is then shifted using shift circuit 136 by a 90° to generate phase error signal 138. A proportional-integral (PI) control circuit 140 process the error signal 138 to generate the phase angle θv control signal for processing by the PWM generator circuit 100.

Although not explicitly shown, it will be understood that limiter circuits (like circuit 110) may be provided for each of the control signals Va and θv.

As discussed above, the calculation of the magnitude of the auxiliary voltage |Va| for the auxiliary winding (a) of the motor requires knowledge of the turn ratio factor α.

Figure 6A:
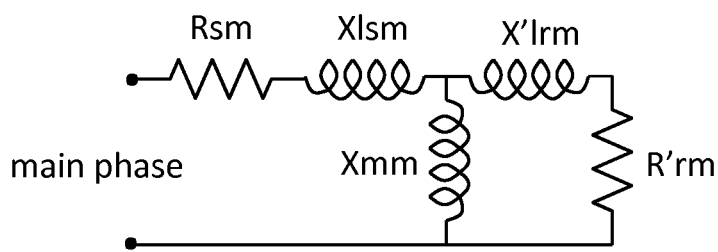
FIGS. 6A and 6B illustrate equivalent circuits.
Figure 6B:
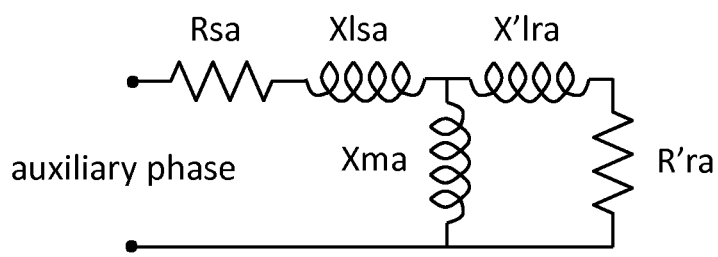

The equivalent circuits for a single phase induction motor which is in fact an asymmetric two phase motor at standstill are shown in FIGS. 6A and 6B. In the equivalent circuits, R'rm and R'ra are the rotor resistances referenced to the main phase winding and auxiliary phase winding, respectively, of the motor. Based on the equivalent circuit representations, these resistances are given by the following formulas:

$$R'_{rm} = \left(\frac{k_{wm}N_m}{k_{wr}N_r}\right)^2 R_r = \left(\frac{N_{m-\mathit{eff}}}{N_{r-\mathit{eff}}}\right)^2 R_r$$

$$R'_{ra} = \left(\frac{k_{wa}N_a}{k_{wr}N_r}\right)^2 R_r = \left(\frac{N_{a-\mathit{eff}}}{N_{r-\mathit{eff}}}\right)^2 R_r$$

In these equations, Nm, Na and Nr refer to the main phase winding turn number, the auxiliary phase winding turn number and the number of rotor bars, respectively. Rr is the actual resistance of the rotor and is a unique value. References Kwa and Kwr are the winding factors.

From the foregoing, it will be noted that the effective turn numbers of the main and auxiliary windings are present in the equations. The effective turn ratio α is thus given by the following equation:

$$\alpha = \frac{N_{a-\mathit{eff}}}{N_{m-\mathit{eff}}} = \sqrt{\frac{R'_{rm}}{R'_{ra}}}$$

Importantly, this equation holds true for all characteristics of winding for single phase induction motors, including accounting for differences in pitch angle and asymmetric distribution. Thus, the equation is applicable for any single-phase induction motor connected to the drive circuit 20.

It will be noted that the turn ratio may be different from motor to motor. If the drive circuit described above is to be useful for controlling different motors, it is necessary to estimate the turn ratio for the connected motor. This operation can be performed by running a test before start-up, this testing referred to as self-commissioning. As noted above, the turn ratio is a function of resistance in the main and auxiliary windings. Step response analysis is performed to calculate the resistances.

It is important as this point to determine the resistances R'rm and R'ra for purposes of calculating the effective turn ratio α applied in scaling by the scaling circuit 120. To that end, a sinusoidal voltage may be applied to the main and auxiliary phase windings, respectively, using the phase relay circuit 18 in the manner described above. Then, the current $I_{AC}$ in each phase is sampled to compute active power $P_{AC}$. From the active power, rotor resistance is calculated using the following equations:

$$R'_{rm} = \frac{P_{AC}}{I_{AC}^2} - R_{sm}$$

$$R'_{ra} = \frac{P_{AC}}{I_{AC}^2} - R_{sa}$$

For implementing this method, the first step is to identify the motor terminals. When resistances between inverter terminals ($R_{AB}$, $R_{AC}$, $R_{BC}$) are calculated, the following table can be used to find how the inverter terminals (A, B and C) are connected to motor terminals (m, c, and a) with a status (ST) corresponding to the determination made using the process of FIG. 3:

| Status | Arrangement |
|---|---|
| ST = 1 | A → c |
|  | B → a |
|  | C → m |
| ST = 2 | A → m |
|  | B → c |
|  | C → a |
| ST = 3 | A → a |
|  | B → c |
|  | C → m |
| ST = 4 | A → m |
|  | B → a |
|  | C → c |
| ST = 5 | A → a |
|  | B → m |
|  | C → c |
| ST = 6 | A → c |
|  | B → m |
|  | C → a |

After identifying the terminal connections, an appropriate voltage can be easily applied to the motor windings.

For measuring rotor resistance seen from main and auxiliary winding, an AC voltage is applied with the nominal frequency and around 5% of nominal magnitude. This is AC voltage application is made to the related phase through actuated relays in the circuit 18, while the other phase is disconnected (floating) by its relay in the circuit 18. For example, for calculating $R'_{rm}$ and with assumption that St=2 from the above table, the relays in circuit 18 that are connected to the terminals A and B are turned on, while the relay in the circuit 18 connected to terminal C is turned off. In this configuration, with reference to FIG. 2A, the AC voltage is applied across the winding between terminals A and B and the winding between terminals C and B is left floating.

With this configuration, only one phase of the motor is involved and proper PWM signals are generated for applying such a voltage to the main phase. The current and voltage are sensed and passed through the low-pass filter. Then the power is calculated based on voltage and current and saved in memory. Additional data is gathered, more than a complete cycle (T=1/f). The average power is calculated as well as its time gradient. When the time gradient of average power is less and a specific value, which is determined by required accuracy, current rms is also calculated and used in the following equation for rotor resistance calculation:

$$R'_{rm} = \frac{P_{AC}}{I_{AC}^2} - R_{sm}$$

The same procedure is performed for auxiliary winding after appropriate relay configuration, and the following equation for rotor resistance calculation:

$$R'_{ra} = \frac{P_{AC}}{I_{AC}^2} - R_{sa}$$

Then the turn ratio is calculated as:

$$a = \sqrt{\frac{R'_{rm}}{R'_{ra}}}$$

Figure 7:
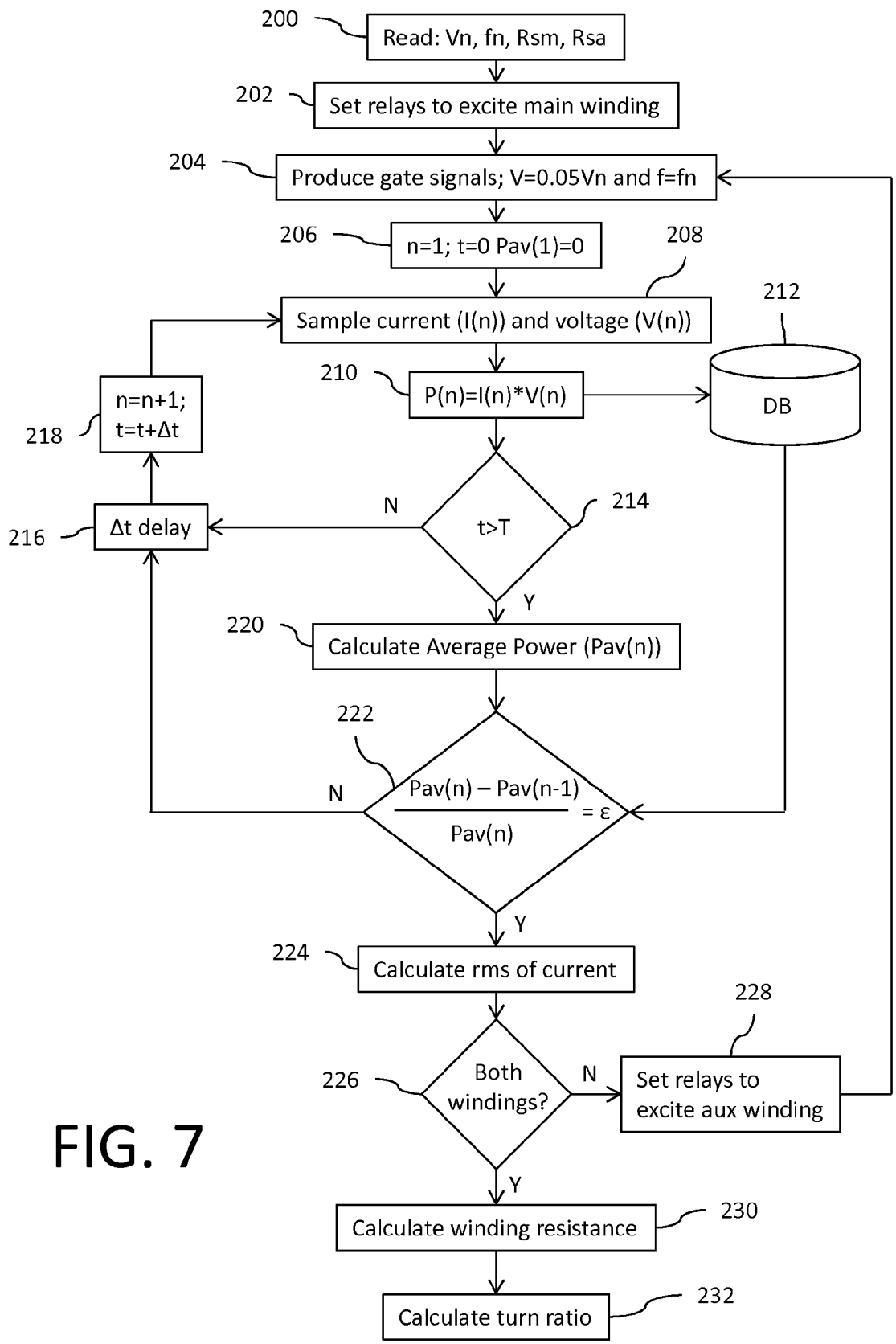
FIG. 7 is a flow diagram for turn ratio calculation.

The flowchart of the foregoing algorithm is depicted in FIG. 7. In step 200, the values for Vn, fn, Rsm and Rsa are obtained. It will be noted that Vn and fn are user inputs, but Rsm and Rsa are values retrieved from storage in memory based on a calculation that has been previously performed in connection with making out the identification of the motor type. In step 202, the relay circuit is controlled to select the main winding of the motor for excitation. The drive circuit is then controlled in step 204 to apply a voltage of v=0.05*Vn to the selected winding with a frequency of f=fn. Initial values for the count n, time t and average power Pav are set in step 206. Current and voltage in the excited winding are then sampled in step 208 and power is calculated in step 210 for storage in database 212. A test is then made in step 214 as to whether the current time exceeds a threshold time T. If not, a time delay is imposed in step 216, the time and counter values are incremented in step 218 and the process returns to step 208 take another sample. When t>T in step 214, a sufficient number of samples have been collected along with a sufficient number of power calculations made. Using the power values from the database 212, an average power calculation is made in step 220. The calculation for average power is made in accordance with the following equation:

$$Pav(n) = \frac{1}{T}\int_{t-T}^{t} P(t')dt'$$

A test in then made in step 222 as to whether a steady-state condition with respect to average power has been reached based on the threshold value of ε. If not, a time delay is imposed in step 216, the time and counter values are incremented in step 218 and the process returns to step 208.

If so, root mean square (rms) of the current in the winding is calculated in step 224. The calculation for rms current is made in accordance with the following equation:

$$Iac = \sqrt{\frac{1}{T}\int_{t-T}^{t}[I(t')]^2/(t')\,dt'}$$

A test is then made in step 226 as to whether both windings have been measured. If not, the relay circuit is controlled to select the auxiliary winding of the motor for excitation in step 228, and the process returns to step 204 to repeat the actions for determining the rms current of the auxiliary winding. After both windings have been tested in accordance with steps 204-224, the process continues in step 230 to calculate the resistances in accordance with the equations noted previously. Then, in step 232, a calculation is made from those resistances of the turn ratio in accordance with the equation noted previously.

It will be readily understood by those skilled in the art that materials and methods may be varied while remaining within the scope of the present invention. It is also appreciated that the present invention provides many applicable inventive concepts other than the specific contexts used to illustrate embodiments. Accordingly, the appended claims are intended to include within their scope such processes, machines, manufacturing, compositions of matter, means, methods, or steps.

What is claimed is:

1. A method for controlling an induction motor having a first motor terminal, a second motor terminal and a third motor terminal, comprising:
    measuring resistances of motor windings between pairs of the first, second and third motor terminals;
    processing the measured resistances to determine whether the induction motor is three-phase induction motor or a single-phase induction motor;
    if the induction motor is determined to be a three-phase induction motor, then controlling the three-phase induction motor using a variable frequency drive process; and
    if the induction motor is determined to be a single-phase induction motor, then controlling the single-phase induction motor using a closed loop current control process.

2. The method of claim 1, wherein controlling the single-phase induction motor further comprises:
    determining a turn ratio for the windings of the single-phase induction motor;
    scaling a measured magnitude of the current in a first winding of the single-phase induction motor by said turn ratio; and
    determining a control voltage for said first winding from the scaled measured magnitude of the current in the first winding.

3. The method of claim 2, wherein said first winding is an auxiliary winding of the single-phase induction motor.

4. The method of claim 2, determining the control voltage comprises offsetting the scaled measured magnitude of the current in the first winding by a measured magnitude of the current in a second winding of the single-phase induction motor.

5. The method of claim 4, wherein determining the control voltage further comprises proportionally integrating the offset the scaled measured magnitude of the current in the first winding.

6. The method of claim 2, wherein determining the turn ratio comprises:
    determining for each winding alone an average power and root mean square (rms) current in the winding;
    calculating from the average power and rms current a resistance for the winding; and
    calculating the turn ratio as a function of a ratio of the resistances for the windings.

7. The method of claim 1, wherein controlling the single-phase induction motor further comprises determining a control voltage for a main winding of the single-phase induction motor as a function of a difference between a desired frequency and a control frequency.

8. The method of claim 7, wherein controlling the single-phase induction motor further comprises implementing a soft-start of the motor by integrating said difference.

9. The method of claim 1, wherein controlling the single-phase induction motor comprises generating pulse width modulated (PWM) control signals applied to a drive circuit coupled to the first, second and third terminals of the motor.

10. The method of claim 9, wherein said PWM control signals are generated as a function of a main winding control voltage, and auxiliary winding control voltage and a phase angle control signal.

11. The method of claim 10, wherein said closed loop current control process generates said auxiliary winding control voltage by:
    scaling a measured magnitude of the current in the auxiliary winding of the single-phase induction motor by a turn ratio of the main winding to the auxiliary winding;
    determining a difference between the scaled measured magnitude of the current in the auxiliary winding and a measured magnitude of the current in the main winding; and
    proportionally integrating the determined difference to generate said auxiliary winding control voltage.

12. The method of claim 11, further comprising determining said turn ratio by:
    determining for the main winding an average power and root mean square (rms) current in the main winding with the auxiliary winding floating;
    calculating from the average power and rms current relative to the main winding a resistance for the main winding;
    determining for the auxiliary winding an average power and rms current in the auxiliary winding with the main winding floating;
    calculating from the average power and rms current relative to the auxiliary winding a resistance for the auxiliary winding; and
    calculating the turn ratio as a function of a ratio of the resistances for the main and auxiliary windings.

13. The method of claim 10, wherein said closed loop current control process generates said phase angle control signal by:
    determining a phase of the current in the main winding;
    determining a phase of the current in the auxiliary winding;
    determining a phase difference between the phases;
    determining an error difference between the determined phase difference and a reference angle;
    proportionally integrating the determined error difference to generate said phase angle control signal.

* * * * *